March 8, 1938. R. R. TEETOR 2,110,562
PISTON RING EXPANDER
Filed July 19, 1935 2 Sheets-Sheet 2
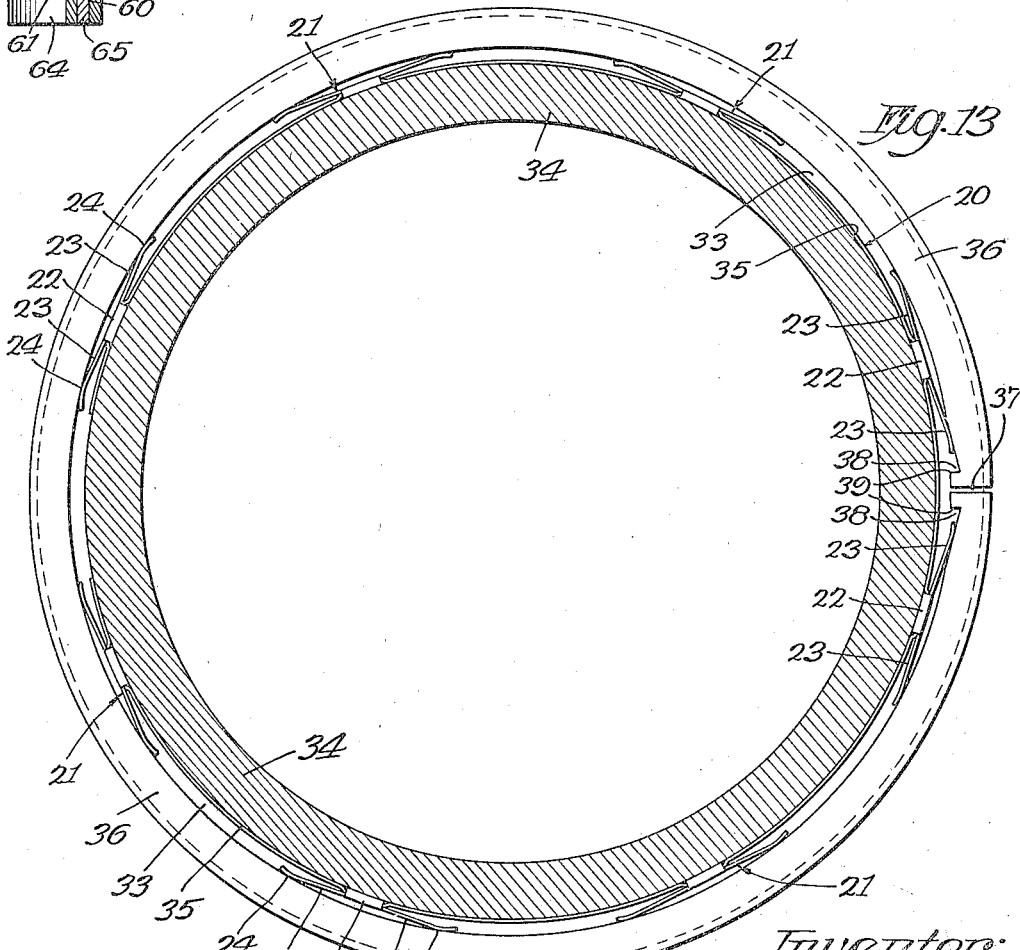

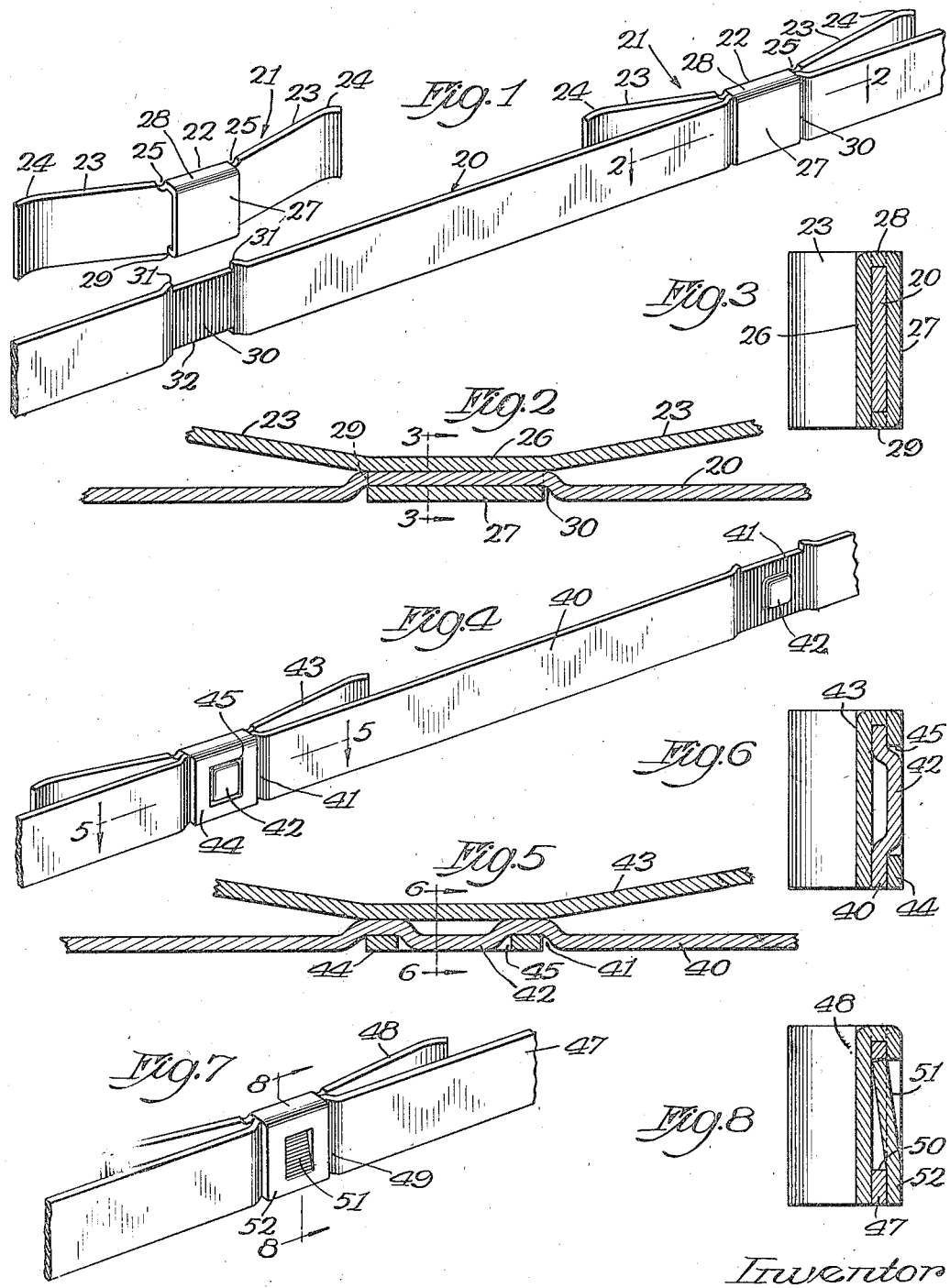

Patented Mar. 8, 1938

2,110,562

UNITED STATES PATENT OFFICE 2,110,562

PISTON RING EXPANDER

Ralph R. Teetor, Hagerstown, Ind., assignor to The Perfect Circle Company, Hagerstown, Ind., a corporation of Indiana Application July 19, 1935, Serial No. 32,178

15 Claims. (Cl. 309—43)

My invention relates to piston ring expanders for use in connection with and adapted to augment the expanding action of piston rings for internal combustion engines and the like.

One of the objects of my invention is to provide an improved piston ring expander which is simple in construction, is inexpensive to manufacture, is easy to install, and which is highly efficient and durable in use.

Another object is to provide an improved ring expander of the type embodying a supporting band adapted to be mounted in a piston ring groove and which carries a plurality of separate, spaced spring members adapted to expandingly engage the piston ring.

A further object is to provide improved means for mounting and positioning the spring members upon the supporting band.

Still another object is to provide an expander of the foregoing character wherein the supporting band and spring members are formed of spring steel, and wherein the spring members are so constructed and arranged with respect to the supporting band that abnormal strains and stresses are practically avoided in use whereby breakage and permanent distortion will not occur and the expander will at all times uniformly serve its intended purpose.

A more specific object is to provide an expander of the foregoing character wherein the supporting band is formed at intervals to provide pocket portions for reception of spring-carried clip means in flush relation with the ring-groove-engaging surface of the supporting band, and by which the spring members are positively located upon and are held in predetermined position upon the supporting band.

Other objects and advantages will become apparent as this description progresses and by reference to the drawings, wherein,—

Figure 1 is a fragmentary perspective view of one form of piston ring expander embodying my invention, and illustrating one spring member in position upon the supporting band and another spring member in position for mounting the same upon the band;

Fig. 2 is an enlarged longitudinal sectional view taken substantially on line 2—2 of Fig. 1;

Fig. 3 is a cross sectional view taken substantially on line 3—3 of Fig. 2;

Fig. 4 is a fragmentary perspective view of another form of expander embodying my invention;

Fig. 5 is a longitudinal sectional view taken substantially on line 5—5 of Fig. 4;

Fig. 6 is a cross sectional view taken substantially on line 6—6 of Fig. 5;

Fig. 7 is a fragmentary perspective view of still another form of expander embodying the invention;

Fig. 8 is a cross sectional view taken substantially on line 8—8 of Fig. 7;

Fig. 9 is a cross sectional view similar to the cross sectional views of Figs. 3 and 6 and showing still another form of my invention.

Fig. 10 is a longitudinal sectional view taken substantially at right angles to Fig. 9;

Fig. 11 is a longitudinal sectional view similar to Figs. 2 and 5, showing an additional form of expander embodying the invention;

Fig. 12 is a cross sectional view taken substantially on line 12—12 of Fig. 11;

Fig. 13 is a sectional top plan view of a piston showing the expander in position behind a piston ring, the section being taken substantially on line 13—13 of Fig. 14; and Fig. 14 is a sectional elevation through a part of a piston and showing expanders behind the rings.

Referring to the expander shown in Figs. 1 to 3, inclusive, it includes a supporting band 20 which may be cut and formed from a sheet or ribbon of soft steel and thereafter heat treated and tempered so that it becomes hard and resilient and has the characteristics of spring steel. It will be appreciated, however, that this form of band may in some instances be made from already-tempered stock. The material from which the band is formed may have a thickness varying from .005 inch to .020 inch, for example, and the band is cut to a width approximately equal to the width of the ring groove in which it is to be received. The length of the band is slightly less than the circumference of the bottom of the ring groove.

The band is constructed and arranged to support a plurality of spring members 21, each spring member being stamped or cut from a sheet or strip of soft steel and finally formed to provide a central clip portion 22 from which spring leaves 23 extend in opposite directions. The spring leaves 23 are of the same width as the band 20, and they are so supported that they extend along the band in an overlying and substantially parallel relation thereto. The spring leaves 23 are curved or bent as shown in Fig. 1 so that the ring contacting points 24 are provided at the end of each spring leaf and, at the same time, any likelihood of the sharp end of the leaf biting into the piston ring is avoided. The upper edges of the spring leaves are also provided, at their junction with the clip portion 22, with curved undercuts 25 which improve the spring action of the spring leaves.

The clip portion 22 of each spring member includes an outer or leaf-supporting part 26 between the spring leaves 23 and also an inner clip member 27 connected to the upper edge of the leaf-supporting part 26 in parallel spaced relation thereto by a right-angled neck 28. The lower free edge of the clip member 27 is provided with a lip 29 turned inwardly at right angles toward the leaf-supporting part 26 against which it is adapted to seat. The neck and lip 29 are, preferably, of the same length and they are, more particularly, of a length equal to the thickness of the material from which the band 20 is formed. After the spring members 21 are shaped to the form just described, they are heat treated and tempered so that the steel becomes hard and resilient like that of the supporting band.

The spring members 21 are each mounted upon the supporting band 20 in a similar manner. The spring-and-band mounting is of a character adapted to definitely locate and position each spring member upon the band against displacement.

The band 20 is pressed outwardly at intervals throughout its length to provide a plurality of flat-bottom pockets 30 of a depth substantially equal to the thickness of the material used in the band and the spring members. The pockets 30 extend substantially throughout the width of the band 20 and they are of a width substantially equal to the width of the flat spring clip members 27. Also, the bottom edges of the pockets are cut away to an extent substantially equal to the thickness of the clip lip to permit the latter to pass beneath the band and engage the leaf-supporting part 26. In applying the spring members 21 to the band 20, it is only necessary to spring the clip members 25 outwardly to an extent sufficient to slide the same over and upon the band so that, when such clip member is released, it will embrace the band with the clip member 27 seated in the pocket 30 as clearly shown in Figs. 2 and 3. It will be seen that when the spring members are applied in this manner, they are definitely located lengthwise of the band by the pockets 30 and displacement of the spring members downward or upward relative to the band is prevented by the clip neck 28 and the lip 29. To further aid in preventing displacement of the spring member lengthwise of the band, I provide upstanding lugs 31 at the opposite upper edges of the pockets 30 between which the clip neck 28 is snugly received.

It will be seen by referring to Fig. 2 that the leaf-supporting part 26 of the clip portion is flat and it has substantially the same dimensions as the pressed out bottom of the pocket 30 upon which it seats. In this way, the pressed out portions of the band 20 forming the pockets 30 serve as substantial fulcrum seats for the spring member 21. Also, by locating the clip portions 27 of the spring members within the pockets 30, the outer surfaces of the clip members 27 lie flush with the inner face of the band 20 so that the supporting band fits snugly to the bottom of the ring groove throughout its length. In this way, a uniform support is provided for the spring members, and distortion, vibration and other effects that may tend to weaken the expander as a whole and impair the desired uniformity in expanding action are avoided. The expander is further improved by arranging the spring member mounting parts in the manner described, the arrangement being such that pressure exerted on the spring leaves 23 is applied directly to the bottom of the ring groove through a substantially solid metallic mass in the form of the leaf-supporting parts 26, the bottoms of the band pockets 30 and the clip members 27. This action is uniform throughout the length and width of the foregoing band and clip surfaces thereby relieving the clip portion 22 of strains and stresses, particularly at the neck portion 28, which would tend to weaken, break down, and shorten the life of the spring structure.

The operation of the expander above described will be better understood by reference to Figs. 13 and 14 illustrating the expander in position in a ring groove 33 of a piston 34. The inner face of the expander supporting band 20 seats against the vertical wall or bottom 35 of the ring groove so that the ring-contacting points 24 of the spring leaves 23 properly bear against the inner surface of the piston ring 36 mounted in the groove. In this way, and by spacing the ring-contacting surfaces 24 around the piston ring in the manner shown, the desired expanding pressure characteristics of the ring against the cylinder wall are provided for. It will be noted that the great flexibility of the ring 36 adjacent the joint 37 thereof is taken care of by mounting the spring members 21 adjacent the ring joint closer together. Each spring leaf 23 operates independently of the other spring leaves and also slides freely against the inner surface of the ring with a minimum of friction, with the result that the proper contact between the ring and the cylinder bore is assured, notwithstanding out-of-round conditions in the cylinder bore. In the use of the expander with a ventilated oil ring, such as shown at 66 in Fig. 14, suitably shaped and located openings 67 may be provided for draining oil into the crank case of the engine.

It is desirable that relative movement between the ring 36 and the expander be prevented; and, to that end, the inner surface of the ring at the ends thereof next to the joint 37 is notched as at 38 providing radial shoulders 39 against which the ends of the adjacent spring leaves 23 abut as the ring and expander tend to rotate relative to each other. A slight clearance is provided between the shoulders 39 and the ends of the adjacent spring leaves so that the latter may flex properly under all operating conditions.

In Figs. 4 to 12, inclusive, I have shown other forms of spring attachment construction embodying my invention. More particularly, the form shown in Figs. 4 to 6, inclusive, includes a supporting band 40 formed similarly to the band 20 except that the bottom walls of the spring-clip pockets 41 are provided with upstanding bosses 42. The spring members 43 of this form are similar to the previously-described form except that the clip members 44 thereof are not provided with lips at their free edges, but have openings 45 therein for snap engagement with the bosses 42 within the band pockets 41 (Fig. 4). With this arrangement, the spring members 43 are positively and firmly located upon the supporting band, and the same spring action is afforded as in the form of Fig. 1.

In the form shown in Figs. 7 and 8, I employ the same general form of supporting band 47 and spring members 48, as previously described, but in this case the bottom walls of the band pockets 49 are provided with openings 50 into which the upper free edges of spring tongues 51 of the clip portions 52 are adapted to snap when the spring members are applied as shown in Fig. 7. The tongues 51 and openings 50 are of substantially the same shape and dimensions so that when the tongues 51 snap into place (Fig. 8), the upper edges thereof engage under the upper edges of the openings 50 and the spring members 48 are definitely located and firmly fixed to the supporting band 47.

The structure illustrated in Figs. 9 and 10 is similar to that of Fig. 1, except that no lips are provided on the free edges of the clip members 55, and the bottom walls of the band pockets 56 extend the full width of the supporting band 57. In this form, the clip members 55 may be located normally a little closer to the leaf-supporting parts of the spring members 58 so that the spring members may be slipped upon the supporting band 57 and frictionally held thereon under tension. With this arrangement, the band pockets 56 definitely locate the spring members upon the band and, when the expander is mounted in the piston ring groove, the spring members are positively locked against displacement in any direction.

The form of expander shown in Figs. 11 and 12 is somewhat similar to that of Figs. 7 and 8 except that the central portions of the bottoms of the band pockets 60 are provided with openings 61 which receive indents 62 formed centrally and inwardly in the clip members 63. It will be seen that, in this form, when the spring members 64 are applied to the supporting band 65, the indents 62 snap-engage within the openings 61 thereby positively locating and securing the spring members 64 upon the band.

It is believed that the operation and advantages of my invention will be fully understood from the foregoing. It is also to be understood that, while I have shown several forms of my invention, other changes in details and arrangements of parts may be made therein without departing from the spirit and scope of my invention as defined by the claims that follow.

I claim:

1. A piston ring expander comprising a supporting band adapted throughout its length to seat flush upon the bottom of the piston ring groove and having pockets therein at intervals throughout its length and opening inwardly toward the inner face of the band, and spring members carried by said band, said spring members including spring clip portions frictionally engaged in said pockets, and spring leaves extending in opposite directions from said clip portion on one side of said band.

2. A piston ring expander comprising a supporting band having outwardly pressed portions therein offset from one face of the band and forming pockets at intervals throughout the length of said band, and spring members each having an attachment portion with spring leaves extending in opposite directions therefrom, said attachment portion embracing said band and having a part received in the respective one of said pockets for locating the respective spring member upon said band and for preventing displacement of said spring member lengthwise of said band.

3. A piston ring expander comprising a supporting band having its inner face offset outwardly at intervals to form spaced pockets therein extending throughout the width of the band, and spring members mounted on said band, each of said spring members comprising a clip portion embracing said band and having a clip part seated in its respective pocket, said clip part being of a thickness not greater than the depth of said pocket, and a spring leaf carried by said clip portion and overlying the outer face of said band.

4. A piston ring expander comprising a supporting band having its inner face offset outwardly at intervals to form spaced pockets therein extending throughout the width of the band, and spring members mounted on said band, each of said spring members comprising a clip portion embracing said band and having a pair of substantially parallel parts, a neck portion connecting said parts spaced apart a distance substantially equal to the thickness of said band, the outer of said parts being seated upon the outer sides of said offset band portions and the inner of said parts being seated within the pockets, said inner part being of a thickness not greater than the depth of said pocket, and a spring leaf connected to said outer part and overlying said band.

5. A piston ring expander formed entirely of spring steel and comprising a supporting band of substantially the same width as the ring groove in which it is to be mounted, said band being offset outwardly at intervals to provide pockets therein, and spring members each having a body part fulcrumed upon an offset portion of said band, spring leaves extending in opposite directions from said body part on the outer side of said band, and a clip member carried by said body part and engaged in said pocket for locating said spring member upon said band and for preventing displacement of said spring member lengthwise of said band.

6. A piston ring expander comprising a supporting band having its inner face offset outwardly at intervals to provide spring-attachment pockets, spring members having clip portions adapted to embrace said band at said offset portions with a part thereof seated in said pockets, and having spring leaves extending along one side of said band in opposite directions from said clip portions, said band and all said spring members being separate parts of spring steel with said clip portions constructed and arranged to snap engage said band.

7. A piston ring expander comprising a supporting band having its inner face offset outwardly at intervals throughout its length providing pockets therein, and spring members mounted along the outer surface of said band, each spring member having a part extending over the top edge of said band and downward into one of said pockets for attachment of the spring member to the band and for locating the position thereof along the band, said spring member part being of a thickness substantially equal to the depth of said pocket so that it lies flush with the inner surface of said band.

8. A piston ring expander comprising a supporting band having its inner surface offset outwardly at intervals throughout its length providing pockets therein, and spring members mounted along the outer surface of said band upon said offset portions and each having a part extending over the top edge of said band and downward into the respective pockets for attachment of the spring member to the band and for locating the same along the band, said spring member part having a length substantially equal to the width of said band, a width substantially equal to the width of said pocket and a thickness substantially equal to the depth of said pocket.

9. A piston ring expander comprising a supporting band having pockets therein at intervals throughout its length, said pockets extending substantially throughout the width of said band and being of a depth substantially equal to the thickness of said band, spring members each having a part seated upon the outer face of said band at one of said pockets, spring leaves extending in opposite directions from said part along and substantially parallel with said band, a clip member of substantially the same shape and dimensions as said pocket mounted in the latter, and a neck portion of a length substantially equal to the thickness of said band connecting said clip member to said spring member part in substantially parallel relation thereto.

10. A piston ring expander comprising a supporting band having a plurality of spaced pockets in the inner face thereof and substantially of the width of the band, and spring members carried by said band including a clip portion, spring leaves extending in opposite directions from said clip portion in overlying relation to the outer face of said band, said clip portion comprising a part adapted to seat upon said band at one of said pockets, and a clip member seated within the respective one of said pockets, said part and clip member being integrally connected at the top thereof by a neck, and said clip member having an inturned lip at its bottom edge adapted to pass under said band and engage said clip portion part.

11. A piston ring expander comprising a supporting band having spaced pockets therein at intervals throughout its length, said pockets opening toward the inner side of said band and extending from substantially edge to edge thereof, spring members carried by said band, each said spring member including a clip portion having an outer part adapted to seat upon said band at one of said pockets, an inner part seated within the respective one of said pockets, a neck at the upper edge of said parts holding the same spaced apart a distance approximately equal to the thickness of said band, and an inturned lip on the lower free edge of said inner part of a length substantially equal to that of said neck, the lower edge of said band forming the bottom of said respective pocket being cut away to permit said lip to pass the band and engage said outer part, and spring leaves integrally carried by said outer part and extending along said band in overlying relation to the outer face thereof.

12. A piston ring expander comprising a supporting band having a plurality of spaced pockets therein opening toward the inner face of the band and extending substantially throughout the width of the band, spring members carried by said band, each of said spring members including an outer spring seated upon said band at one of said pockets and extending along the outer face of the band in overlying relation thereto, and means for fastening said spring to said band including a clip member adapted to be received in the respective one of said pockets, and a neck element integrally connecting said clip member to said spring in closely spaced relation, so that the parts mentioned snugly fit together when assembled, said band being provided at its upper edge at the sides of said respective pocket with upstanding ears that embrace said neck element and confine the same therebetween.

13. A piston ring expander comprising a supporting band having pockets therein at intervals, spring members carried by said band and each having a spring leaf overlying the outer face of said band, and means for fastening each said spring leaf to said band including a part seated upon the band at the respective one of said pockets, a clip member seated in the respective one of said pockets, a neck supporting said part and clip member in spaced and substantially parallel relation embracing said band, and means including an element projecting from said band within said respective pocket and an opening in said clip member receiving said element for snap-engaging said clip member and band as said clip member is engaged in said pocket.

14. A piston ring expander comprising a supporting band having pockets therein at intervals throughout its length, spring members carried by said band and each having a spring leaf overlying the outer face of said band, and means for fastening each said spring member to said band including a part seated upon the outer face of the band at one of said pockets, a clip member seated in the respective one of said pockets, a neck supporting said part and clip member in spaced and substantially parallel relation embracing said band, and means including a spring tongue projecting from said clip member and a similarly-shaped opening in the bottom of said pocket receiving said spring tongue.

15. A piston ring expander comprising a supporting band having pockets therein at intervals throughout its length, spring members carried by said band and each having a spring leaf overlying the outer face of said band, and means for fastening each said spring leaf to said band including a part seated upon the outer face of the band at the respective one of said pockets, a clip portion seated in the respective one of said pockets, a neck supporting said part and clip portion in spaced and substantially parallel relation embracing said band, and an inwardly projecting indent in one of said portions and a similarly-shaped opening in the other of said portions for receiving said indent.

RALPH R. TEETOR.